United States Patent
Boies et al.

(10) Patent No.: US 9,318,109 B2
(45) Date of Patent: Apr. 19, 2016

(54) TECHNIQUES FOR UPDATING A PARTIAL DIALOG STATE

(71) Applicant: Microsoft Technology Licensing, LLC, Redmond, WA (US)

(72) Inventors: Daniel Boies, Saint-Lambert (CA); Ruhi Sarikaya, Redmond, WA (US); Alexandre Rochette, Montreal (CA); Zhaleh Feizollahi, Bellevue, WA (US); Nikhil Ramesh, Kirkland, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 122 days.

(21) Appl. No.: 14/044,802

(22) Filed: Oct. 2, 2013

(65) Prior Publication Data

US 2015/0095033 A1    Apr. 2, 2015

(51) Int. Cl.
*G10L 15/00* (2013.01)
*G10L 15/18* (2013.01)
*G06F 17/30* (2006.01)
*G06F 17/27* (2006.01)

(52) U.S. Cl.
CPC ...... *G10L 15/1815* (2013.01); *G06F 17/30654* (2013.01); *G06F 17/2785* (2013.01)

(58) Field of Classification Search
CPC ..... G10L 15/08; G10L 15/1815; G10L 15/22; G10L 15/18; G10L 15/02; G10L 15/01; G10L 15/183; G10L 15/00; G10L 17/005; G10L 25/48
USPC .................... 704/4, 9, 14, 236, 257
See application file for complete search history.

(56) References Cited

U.S. PATENT DOCUMENTS

2006/0149544 A1    7/2006   Hakkani-Tur et al.

OTHER PUBLICATIONS

Selfridge, et al., "Integrating Incremental Speech Recognition and POMDP-based Dialogue Systems", In Proceedings of the 13th Annual Meeting of the Special Interest Group on Discourse and Dialogue, Jul. 5, 2012, 5 pages.*
Hakkani-Tur, et al., "A Discriminative Classification-Based Approach to Information State Updates for a Multi-Domain Dialog System", In Annual Conference of the International Speech Communication Association, Sep. 2012, 4 pages.*
Young, et al., "POMDP-based Statistical Spoken Dialogue Systems: a Review", In Proceedings of the IEEE, vol. 101, Issue 5, May 2013, 18 pages.

(Continued)

*Primary Examiner* — Thierry L Pham
(74) *Attorney, Agent, or Firm* — Danielle Johnston Holmes; Steven Spellman; Micky Minhas

(57) ABSTRACT

Embodiments provide for tracking a partial dialog state as part of managing a dialog state space, but the embodiments are not so limited. A method of an embodiment jointly models partial state update and named entity recognition using a sequence-based classification or other model, wherein recognition of named entities and a partial state update can be performed in a single processing stage at runtime to generate a distribution over partial dialog states. A system of an embodiment is configured to generate a distribution over partial dialog states at runtime in part using a sequence classification decoding or other algorithm to generate one or more partial dialog state hypothesis and/or a confidence score or measure associated with each hypothesis. Other embodiments are included.

20 Claims, 8 Drawing Sheets

(56) References Cited

OTHER PUBLICATIONS

Raux, et al., "Efficient Probabilistic Tracking of User Goal and Dialog History for Spoken Dialog Systems", In 12th Annual Conference of the International Speech Communication Association, Aug. 27, 2011, 4 pages.

Williams, et al., "Dialog State Tracking Challenge Handbook", Retrieved on: May 28, 2013, Available at: http://research.microsoft.com/pubs/169024/Dialog%20state%20tracking%20challenge%20handbook%20V21.pdf, 32 pages.

Raux, et al., "A Finite-State Turn-Taking Model for Spoken Dialog Systems", In Human Language Technologies: Annual Conference of the North American Chapter of the Association for Computational Linguistics, May 31, 2009, 9 pages.

* cited by examiner

TECHNIQUES FOR UPDATING A PARTIAL DIALOG STATE

BACKGROUND

Dialog or conversation systems typically involve multiple processing/analysis stages running in sequence to process user input as part of inferring a user goal. For example, a dialog system may use a processing stage that uses an Automatic Speech Recognizer (ASR) to convert audible user commands into text before using a subsequent Language Understanding (LU) processing stage to convert the text into a semantic representation. The multiple processing stages of each dialog system typically include non-zero error rates and one of the main limitations lies in the uncertainty of the state of a conversation at any point in time due in part to the lack of robustness of the various processing stages. Developers of dialog systems continually experiment in attempts to reduce or eliminate the amount of uncertainty and improve the accuracy of the state of the conversation.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments provide for tracking a partial dialog state as part of managing a dialog state space, but the embodiments are not so limited. A method of an embodiment jointly models partial state update and named entity recognition using a sequence-based classification or other model, wherein recognition of named entities and a partial state update can be performed in a single processing stage at runtime to generate a distribution over partial dialog states. A system of an embodiment is configured to generate a distribution over partial dialog states at runtime in part using a sequence classification decoding or other algorithm to generate one or more partial dialog state hypothesis and/or a confidence score or measure associated with each hypothesis. Other embodiments are included.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

Figure 1:
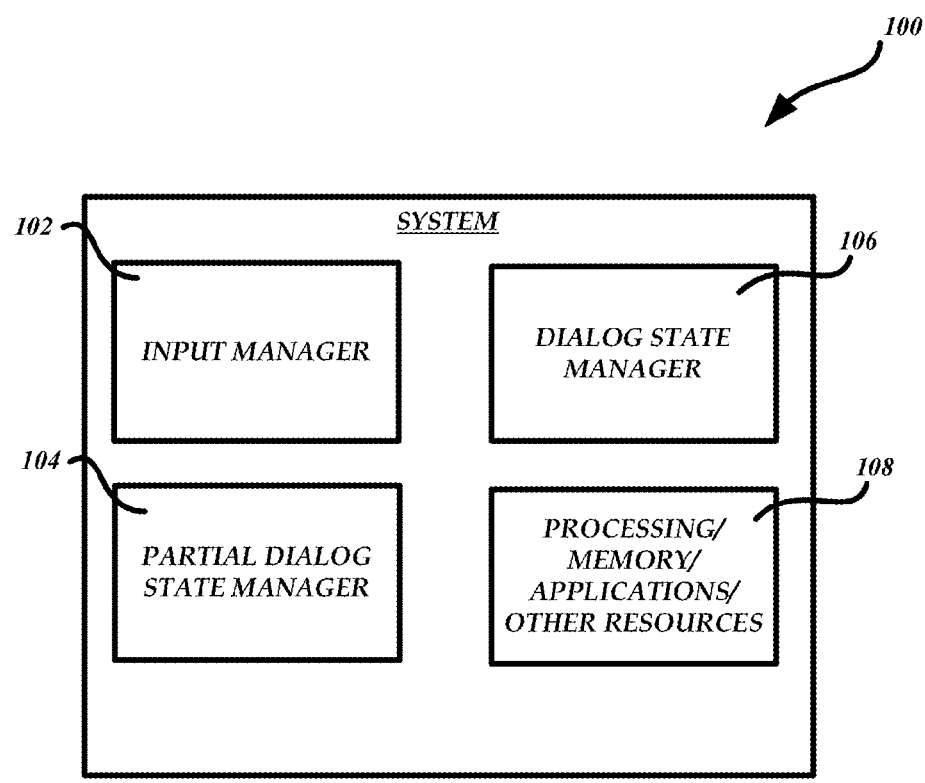
FIG. 1 is a block diagram of an exemplary computing system configured to manage a dialog state space based in part on a partial dialog state update model.

FIG. 1 is a block diagram of an exemplary computing system 100 configured to manage a dialog state space based in part on a partial dialog state update model, but is not so limited. As described below, the system 100 is configured to track various aspects of the state of an environment or dialog state by treating a user goal and/or context as partially observable random variables that may be inferred from observations, but is not so limited. Depending on each particular implementation and/or training process, a dialog state space potentially includes information associated with various sources, such as information explicitly originating from the user input and/or user/application context parameters augmented with knowledge results obtained from knowledge or information sources.

As described below, the system 100 operates in part to perform a partial dialog state update which integrates a semantic representation of the user input results across multiple turns as part of constructing a query that reflects a user goal and incorporates constraints accumulated across turns. The system 100 of an embodiment operates to generate a full dialog state by combining information obtained from knowledge sources or other results with a partial dialog state at a defined turn. Conventional approaches do not utilize a distinct partial state update prior to an information retrieval stage. According to one implementation, partial state update and named entity recognition (slot detection) are jointly modeled using a sequence-based classification model that retains temporal information, wherein recognition of named entities and a partial state update can be performed in a single processing stage at runtime to generate a distribution over partial states given certain observations.

As shown in FIG. 1, the exemplary system 100 includes an input manager 102, a partial dialog state (PDS) manager 104, a dialog state (DS) manager 106, and processing/memory/applications/other resources (collectively shown as 108). For example, the exemplary system 100 is representative of a handheld or portable computing device, such as a tablet, smartphone, etc., as well as desktop, laptop, gaming, server, and other computing devices/systems. It will be appreciated that complex communication architectures typically employ multiple hardware components including, but not limited to, server computers, networking components, and other components that enable communication and interaction by way of wired and/or wireless networks.

The input manager 102 is configured to manage various types of received input, such as typed or clicked input, vocal input, gesture input, etc. In one embodiment, the input manager 102 operates to convert user input into a textual representation that is used as an input to one or more other components of the system 100. For example, the output of the input manager 102 can be input into a natural language processing system/engine to generate a sematic representation of the user input, as described further below. According to the example of FIG. 1, the output of the input manager 102 is used by the PDS manager 104 to track and/or manage a partial dialog state. The PDS manager 104 of an embodiment uses a dialog management model to jointly model slot detection and a partial dialog state using sequence classification features at each turn. In one embodiment, a sequence classification technique is used along with temporal and/or positional information to quantify a partial dialog state.

A turn can be described as a portion of a session where user input is processed, such as after a first or each subsequent user command for example. Slot detection can be described as a process of detecting which portion or portions of a particular span or sentence, input sequence, or string that should or should not be assigned a value or values that quantify a partial dialog state. The DS manager 106 uses the partial dialog state as part of determining a dialog state. For example, after a defined number of turns or other defined criteria, the DS manager 106 can use an input associated with an updated partial dialog state to form queries and obtain information or otherwise provide a dialog state. The dialog state may be used by other components, as described further below, for some further action, such as executing some defined policy according to a particular dialog state for example.

The PDS manager 104 of an embodiment is configured in part to use a sequence-based classification model for partial dialog state updating operations. The PDS manager 104 of one embodiment operates at runtime to update a partial dialog state at each turn using the sequence-based classification model that integrates semantic information across turns and occurs before an information retrieval stage and/or policy execution stage. A partial dialog state of an embodiment can be configured as a time ordered sequence of estimated entities and/or an estimated user goal. The PDS manager 104 of one embodiment operates at each turn to perform named entity recognition on a full text sequence accumulated up to a current turn, whether from a first turn or other defined turn.

As will be appreciated, the sequence-based classification model can be trained using annotated session data. For example, training can include, for each turn, identifying which entities or contextual labels/values (e.g., slots) to maintain and/or drop to define a partial dialog state for user input accumulated up to a current turn. Thus, given labeled turn/session data, the sequence-based classification model is learned. As described below, at runtime, the PDS manager 104 uses the sequence-based classification model to generate a number of potential partial dialog states or hypotheses from which a distribution over partial dialog states can be determined.

Various embodiments may be used with a number of computer configurations, including hand-held devices, multiprocessor systems, microprocessor-based or programmable consumer electronics, minicomputers, mainframe computers, etc. Various embodiments may be implemented in distributed computing environments using remote processing devices/systems that communicate over a one or more communications networks. In a distributed computing environment, program modules or code may be located in both local and remote memory. Various embodiments may be implemented as a process or method, a system, a device, article of manufacture, computer readable storage or computer storage, etc.

Figure 2:
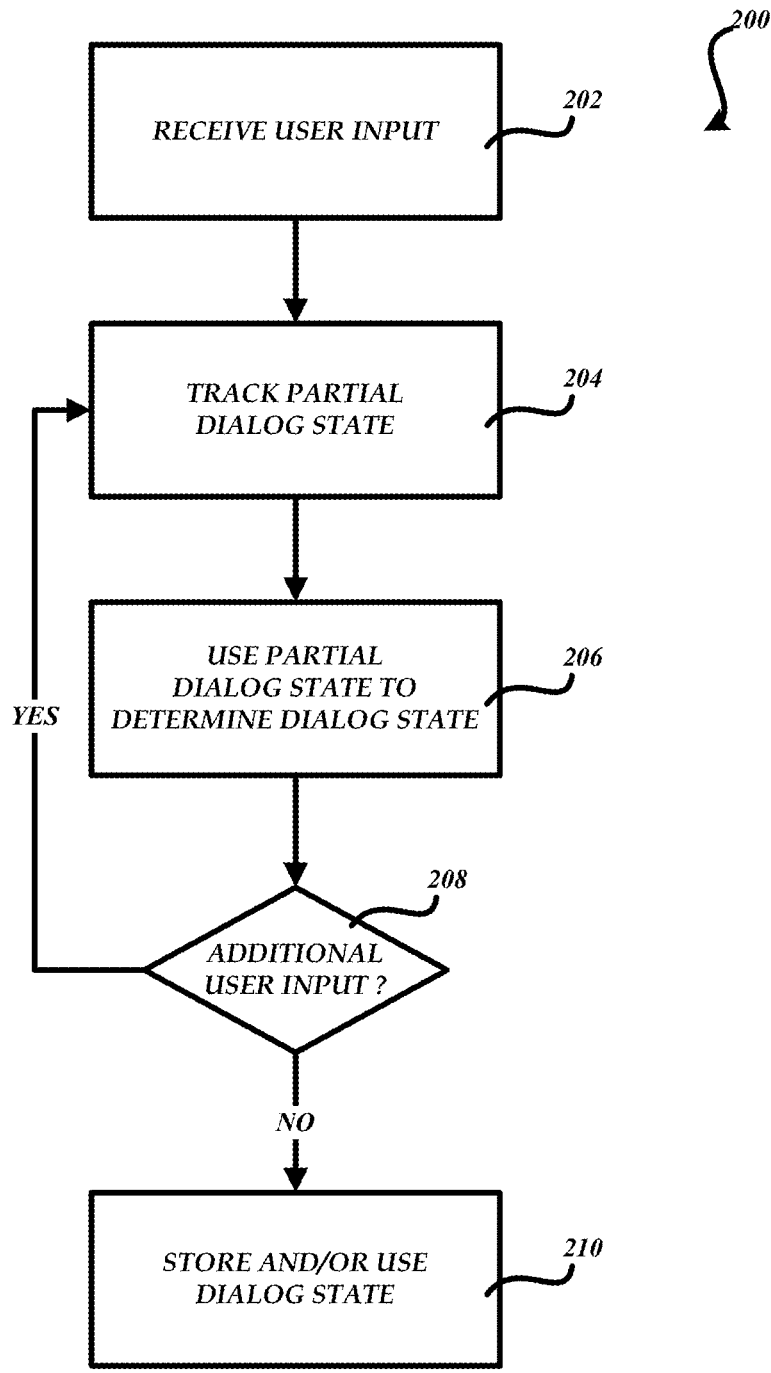
FIG. 2 is a flow diagram depicting an exemplary process of tracking a user goal based in part on the use of a sequence classification technique to update a partial dialog state.

FIG. 2 is a flow diagram depicting an exemplary process 200 of tracking a user goal based in part on the use of a discriminative or a sequence classification technique to update a partial dialog state according to an embodiment. The process 200 assumes training has been used to determine model parameters used in tracking and/or updating a partial dialog state space or distribution. The process 200 at 202 begins by receiving user input. For example, the process 200 at 202 may receive user voice or typed input via a smartphone, game console, tablet computer, etc. as part of tracking a user goal associated with the user input. According to an embodiment, the process 200 at 202 generates a textual representation associated with the user input.

At 204, the process 200 operates using the input to determine a partial dialog state. The partial dialog state is representative of the user goal and according to an embodiment defined in part by one or more hypothesis resulting from application of a sequence classification technique at runtime as part of managing slots to keep or remove that are representative of the partial dialog state. In one embodiment, the process 200 at 204 operates at runtime to track the partial dialog state by jointly modeling slot detection and partial dialog state tracking at each turn using a sequence classification technique or sequence classifier to generate one or multiple hypothesis, wherein each hypothesis can be associated with a score, probability, and/or other measure. In another embodiment, a natural learning or other processing stage can be used to detect slots before passing the information to a partial dialog state processing component to track the partial dialog state.

At 206, the process 200 uses the partial dialog state as part of determining a dialog state. In an embodiment, the process 200 at 206 operates to form queries based on the partial dialog state and use knowledge results based on the queries to identify a dialog state or dialog state distribution for a particular turn, group of turns, or number of turns. It will be appreciated that other information may be used to determine the dialog state. If there is no further input or the session has ended, the process 200 at 208 proceeds to 210 and stores and/or uses the dialog state. The process 200 at 210 of an embodiment uses the dialog state as part of performing some action or policy. For example, the policy may be executed to pull reviews for certain movies associated with the dialog state and the user goal.

Table 1 below provides an example interactive dialog between a user and a receiving device/system. As shown in the Table, the exemplary partial dialog state is updated at each turn.

TABLE 1

| Turn number | User input | Partial dialog state input | Partial state update output |
|---|---|---|---|
| 0 | show me horror movies | show me horror movies | {movie_genre="horror"} |
| 1 | how about comedies instead | show me horror movies how about comedies instead | {movie_genre="comedies"} |
| 2 | go back | show me horror movies how about comedies instead go back | {movie_genre="horror"} |
| 3 | with anthony hopkins | show me horror movies how about comedies instead go back with anthony hopkins | {movie_genre=" horror", movie_actor=" anthony hopkins"} |
| 4 | no dramas with tom hanks | show me horror movies how about comedies instead go back with anthony hopkins no dramas with tom hanks | {movie_genre="dramas", movie_actor="tom hanks"} |

As shown in the Table above, the partial dialog state process 200 has operated to update the partial dialog state using information gathered from the user input at a current turn as well as from one or more prior turns to track a changing user goal from turn to turn for this example. While a certain number and order of operations is described for the exemplary flow of FIG. 2, it will be appreciated that other numbers and/or orders can be used according to desired implementations.

Figure 3:
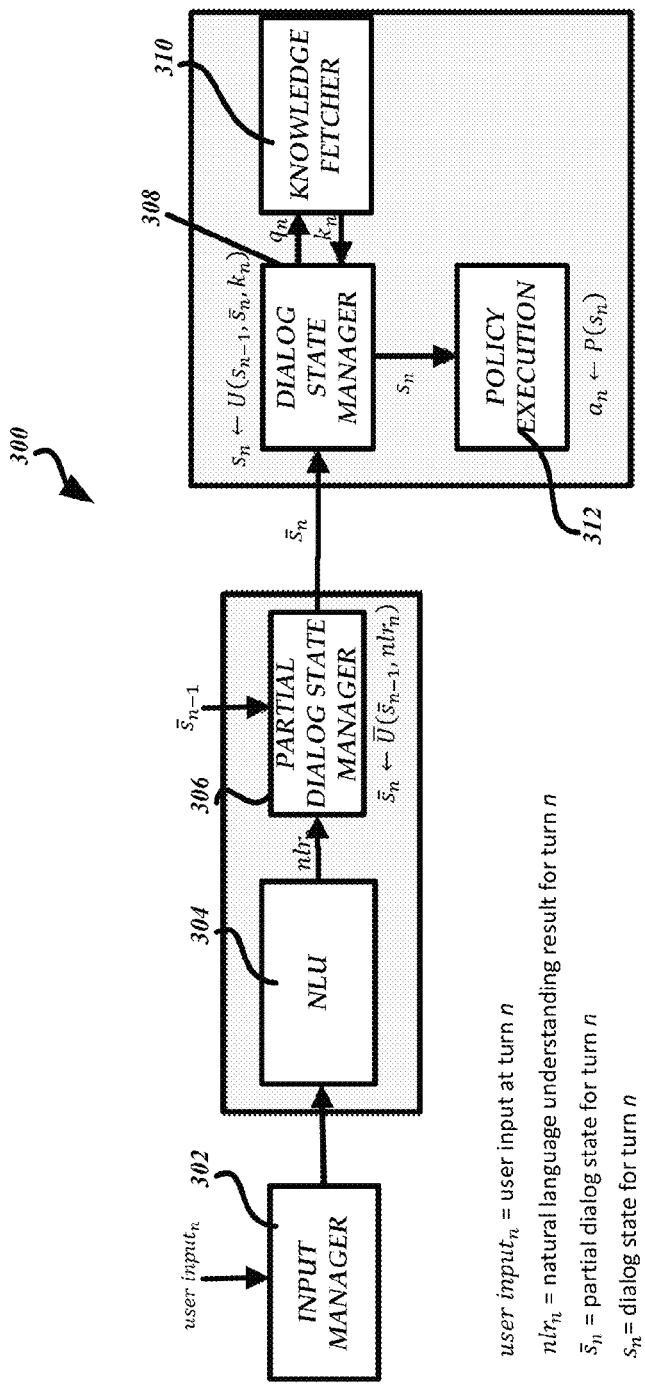
FIG. 3 is a block diagram of an example device/system configured with dialog processing features.

FIG. 3 is a block diagram of an example device/system 300 configured with dialog processing features that operate to track and/or manage a dialog state according to an embodiment. As shown in FIG. 3, the device/system 300 includes an input manager component or input manager 302, a natural language understanding (NLU) component 304, a partial dialog state (PDS) manager component or PDS manager 306, a dialog state (DS) manager component or DS manager 308, knowledge fetcher 310, and/or policy execution 312.

As described below, the components of the device/system 300 can operate and run using parallel and/or sequential processing operations or workflows. As an implementation example, the input manager 302 can be configured to process various types of user inputs, such as audible inputs using automatic speech recognition features (e.g., an Automatic Speech Recognizer (ASR)). An ASR or other component can be implemented to generate a ranked list of textual hypotheses or candidates (e.g., one or more ranked hypothesis) associated with the user input.

Depending on the implementation, whether configured integrally or as a separate component or stage, NLU component 304 is configured to operate in part to convert the user input output from input manager 302 into a semantic representation for further processing. In one embodiment, the features and functionality of the NLU component 304 can be included as part of another component, such as the input manager 302 and/or the PDS manager 306 for example. The NLU component 304 of an embodiment can be configured to generate one or more of semantic representation hypothesis based on the user input output from the input manager 302, whether typed, spoken, gestured, or otherwise detected. It will be appreciated that a semantic representation associated with particular user input may be inferred from a text representation of the user input output by the input manager 302.

In an embodiment, the NLU component 304 operates to output a semantic representation according to a number of sentence level classes such as domain, intent, goal, etc. As described below, the output of the NLU component 304 is used as an input to the PDS manager 306 as part of tracking a partial dialog state. An output of the PDS manager 306 is used as an input to the DS manager 308 to manage the dialog state space. As shown for this example, the DS manager 308 is configured to receive input from knowledge fetcher component 310 to generate an output that is used by the policy execution component 312 as part of performing or executing some policy, action, or the like.

User input processing of an embodiment can be described as sentence level processing corresponding to the characteristic of semantic processing that may not necessarily refer to particular words of a sentence. As used herein, a slot refers to a particular span or portion of a sentence, input sequence, or string that has been detected and may or may not have a value, as shown further below by example. According to an embodiment, the PDS manager 306 can use the output of the NLU component 304 as part of detecting, tracking, and/or managing one or more slots associated with user input over each turn before updating a dialog state and/or using the knowledge fetcher 310.

A filled slot refers to a particular span or portion of a sentence, input sequence, or string having an assigned value. As described further below, the NLU component 304 and/or PDS manager 306 can use a model that enables detecting of slots and/or values to thereby provide filled slots which can be used by the policy execution component 312 in executing of a policy or action for example. It will be appreciated that a slot and/or a filled slot of an embodiment comprises a portion of a partial dialog state space. The PDS manager 306 of an embodiment is configured to manage slots using a sequence classification algorithm or sequence classifier such as a generative Hidden Markov Model (HMM) or a discriminant Conditional Random Field model for example.

As an example, assume that for the user input "show me romantic comedies with tom hanks," the PDS manager 306 operates to identify that a domain may be "movies" while an intent may be "find_movies." Thus, for such an example, the PDS manager 306 operates to track filled slots that correspond to a span in the sentence, wherein the filled slots are: movie_genre="romantic comedies" and movie_actor="tom hanks". A partial dialog state can be used to retrieve information from knowledge sources as well as deriving features to condition a dialog policy, action, or the like.

The PDS manager 306 uses the model in part to reduce an amount of uncertainty associated with a state of the conversation or dialog between the user and the device/system 300 improving robustness of the various stages of processing. State of the conversation or dialog may be referred to as information extracted and/or accumulated during a session over a number of turns and/or results obtained by searching knowledge sources to answer user requests/commands and/or what is being displayed on a device/system screen or display. The model allows the device/system 300 to reduce the impact of errors upon the partial dialog state space and/or any associated policy execution or action.

According to an embodiment, the model used with the PDS manager 306 involves the explicit modeling of uncertainty in belief tracking to be more robust to errors and improve the ability to recover from errors. In one embodiment, a state of an environment comprising a partial dialog state uses random variables to track a user goal and/or conversation context with values that may be inferred from observations. For example, a slot such as "movie_actor" can be treated as a random variable since it may take any value from a set of possible values (in this case the set of all movie actors). A probability that such a variable has a particular value can be defined and estimated (e.g., the statement that the probability of a variable equals some value (p(movie_actor="tom hanks")=0.9)). In one embodiment, observations include confidence scores associated with a number of (e.g., an n-best list) text representations or hypotheses generated by the automatic speech recognition system or other text generating component.

For example, uncertainty may result from a detected slot value being incorrect, and resulting in an uncertainty associated with the value of the associated slot. Assume that for an example issued query "show me movies with hillary swank" that an ASR recognizes "show me movies with tom hanks" with low confidence. The DS manager 308 can then identify a filled slot: movie_actor="tom hanks" with a probability estimate based on an ASR confidence factor and/or other variables to arrive at a hypothesis of p(movie_actor="tom hanks")=0.6.

Statistical approaches may use a distribution over a dialog state space as an input to the policy execution component 312 or other component. As used herein, a distribution can be described as an estimate of the probability of all dialog states or groups of states or defined portions of a dialog state space.

Assume for example, that the model shows a high confidence factor or is sure that a user wants movie_genre="science fiction" and movie_actor="noomi rapace," then the probability of dialog state {movie_genre="science fiction" and movie_actor="noomi rapace"} equals one and the probability of the other states of such a dialog state space is equal to zero. As such, the distribution for this example peaked on a single dialog state. For example, if a given action requires only one instance of a slot (e.g. if the "play" action requires that only one movie_name be specified by the user) and the most probable dialog state contains two instances of this slot (e.g. two movie names), a dialog policy might decide to issue a "disambiguate" dialog action instead of play_movie, wherein the decision would be based on the distribution over the pertinent dialog state space.

As described above, a dialog state space can include information originating from various sources. For example, a dialog state space may include information extracted from the user input (e.g., text from ASR or direct input and resulting semantic representation from the NLU component 304) and/or user/application context (e.g., What is on screen or what was on screen in the previous turn etc.) augmented with knowledge results or other information obtained by querying knowledge sources or other information sources. For example, in a search application as part of arriving at best results/goals, user queries specify criteria that results should satisfy. For e.g., the user input could be "show me baroque classical music," wherein a "music" search back-end server receives a query constructed from the user input. In the case of a room reservation application, a knowledge back-end may be queried to find out if a room is available or not. It will be appreciated that the number of knowledge sources may be dependent on a given application, context, or other implementation preference.

An exemplary dialog state space distribution can be represented as a list of ranked hypotheses. Each hypothesis of an embodiment includes one or more of an ASR hypothesis, a semantic interpretation hypothesis for that given ASR hypothesis, and/or a knowledge result. Each hypothesis can be associated with a confidence score and/or a mapping from each hypothesis to the corresponding confidence score to define a distribution over the dialog state space. For this example, to avoid over processing and inefficient dialog, the model may not generate all possible dialog states in the state space (as the number of possible states is potentially very large (or even infinite)). Rather, the model of an embodiment predicts and explicitly generates certain dialog states having non-zero probabilities to obtain a list of hypotheses having a finite length.

In accordance with an embodiment, the PDS manager 306 is configured to manage and/or update a partial dialog state before proceeding to determining a full dialog state and/or querying of any knowledge sources. The PDS manager 306 enables for the querying of knowledge sources as part of obtaining one or more results that reflect each user goal based on given constraints. The PDS manager 306 of an embodiment manages updating of the partial dialog state by integrating the semantic representation of the user input across multiple turns which may include one or more of the first turn, intermediate turns, and/or a current turn. Correspondingly, the PDS manager 306 operates to provide a partial dialog state that does not include or is absent of information derived from knowledge results.

The PDS manager 306 of one embodiment uses outputs from the NLU component 304 to track the partial dialog state and manage the partial dialog state space by outputting a partial dialog state at each turn. The DS manager 308 of an embodiment operates to generate a full dialog state based in part on a partial dialog state output or features derived therefrom, as well as other information originating from knowledge results and other sources such as client context, application context, etc. The PDS manager 306 of one embodiment is configured to output a partial dialog state that includes all filled slots identified during a session that remain relevant in the current or other defined turn. A session of one embodiment can be defined as a sequence of subsequent turns, wherein the beginning of the session is characterized by the fact that the partial dialog state is "empty" when the first turn is initiated.

The PDS manager 306 of an embodiment uses a model that uses sequence classification features to perform partial dialog state tracking in part by determining which slots to keep or drop at each turn to quantify a partial dialog state update. The model of an embodiment enables updating of the partial dialog state and construction of knowledge queries that reflect the user's goal while incorporating pertinent constraints accumulated across turns, such as new or modified constraints for example. The DS manager 308 of an embodiment compiles a full dialog state by combining information inferred from the knowledge results resulting from the knowledge queries, and/or other sources of information.

With continuing reference to FIG. 3, the PDS manager 306 can use a sequence classification technique as part of managing partial dialog state updates. As described above, the PDS manager 306 can operate to perform a partial dialog state update before querying knowledge sources and/or determining a full dialog state in order for the knowledge queries to take into account all the requirements or constraints that the user added across turns. The PDS manager 306 of one embodiment operates to perform a distinct partial dialog state update prior to an information retrieval operation. Thus, the partial dialog state of such an embodiment represents the state of the dialog prior to issuing queries to knowledge sources. The partial dialog state can be used by the DS manager 308 to construct knowledge queries that include slots detected and/or filled during a session that remain relevant at the current turn. Thus, the PDS manager 306 operates in part to identify slots that remain relevant and/or are no longer relevant to arrive at the partial dialog state for a particular turn.

As described above, the PDS manager 306 of one embodiment uses a sequence classification technique at runtime to track the partial dialog state as opposed to attempting to explicitly estimate the probability distribution over states. The sequence classification technique is used to predict a class given observations. The prediction can be contrasted with training which is typically an offline process where model parameters are estimated. In accordance with an embodiment, at runtime, a trained model is used to estimate a distribution over partial dialog states given observations using sequence classification decoding operations to generate one or more hypothesis (e.g., an n-best list) with a confidence score and/or probability for each hypothesis. Accordingly, the one or more hypothesis can be used as an estimate of the distribution over a partial dialog state space.

Sequence classification naturally accounts for dependencies between the observations (e.g., the words that appeared in the sequence of user inputs up to the current turn) at successive or other positions in a sequence of observations. Dialog state tracking based on sequence classification naturally takes into account temporal information. For example, the order in which the words appeared in the sequence of user inputs up to the current turn can be modeled. As described above, the PDS manager 306 of an embodiment can be configured to jointly model slot detection and partial dialog state tracking.

Modeling of an embodiment includes estimating model parameters based in part on the use of examples annotated by humans during an offline training procedure using a Machine Learning algorithm. This can be distinguished with the use of a model at runtime to predict classes. A single model can be trained to detect slots and handle the tracking of slots. The single model of an embodiment is executed at runtime to detect entities and manage which slots detected up to the current turn remain relevant in the current turn. Joint modeling is possible because slot detection can also use sequence classification which enables the combining of state update and slot detection tasks using the same technique. In a configuration where the two tasks are simultaneously performed at runtime, the advantage allows a single stage of slot detection and partial dialog state update at runtime, wherein a single model can be trained to perform both tasks.

According to an alternative embodiment, the two tasks can be separated such that a separate turn instantaneous slot detection stage is used to detect the slots only in the current user input (e.g., at each turn), and a second stage where sequence classification-based partial dialog state tracking is performed. In this second configuration, the output of the turn instantaneous slot detection can be used as an input to extract features for the partial dialog state update stage.

In a regime where the amount of supervised training examples is large, sequence classification models based on discriminative supervised learning are known to outperform generative models. Accordingly, sequence classification operations are used to track the partial dialog state at runtime while using either a generative or discriminative sequence classification algorithm to train the model as appropriate.

According to an embodiment, training of the sequence classification technique or model (also referred to as model parameter estimation) is provided based in part on learning using examples annotated by humans (e.g., a supervised learning training process). The sequence classification model used to update the partial dialog state may also be trained in the "reinforcement learning" framework. Model training can be performed as part of an offline process that involves the use of a training algorithm to estimate the model parameters.

Data used to train the model may be annotated in a session-aware manner. For example, human annotators can review sessions involving ordered sequences of user inputs (e.g., samples) as opposed to being presented with individual samples independently. As such, annotators may be able to infer from the context which of the slots that were filled up to the current turn remain relevant in the current turn. Annotators can incrementally annotate turns of a session starting with the first turn or some other turn.

An example of an annotated session follows, wherein the number between parentheses is the number of the turn when the corresponding slot was filled:

At turn 0:
User input text: "show me woody allen movies from the seventies"
Partial dialog state annotation: {movie_actor(0)="woody allen", media_type(0)="movies", movie_release_date(0)="seventies"}
At turn 1:
User input text: "only the ones he directed"
Partial dialog state annotation: {media_type(0)="movies", movie_release_date(0)="seventies", movie_director(1)="woody allen",}

At turn 1, the movie_release_date(0) slot was "filled" by the user in the previous turn but the human annotator infers from the context that it is to be kept in the current turn as it is still implied as a goal of the user.

Also, the word sequence "woody allen" was input by the user in the first turn and was relabeled by the annotator as suggested by the context of the user commands.

At turn 2:
User input text: "what about batman games"
Partial dialog state annotation: {media_type(2)="games", game_character(2)="batman"}

At turn 2, the user's focus or goal has shifted and the annotator has inferred from the context that all slots from turns 0 and 1 are no longer relevant and are therefore dropped.

As shown by the example above, annotators can be presented with a sequence of text inputs and add annotations corresponding to slots defined by a pre-determined schema to identify if parts of the text correspond to the value of a slot. The annotated sessions represent the "truth" and can be presented to a model training algorithm. According to this example, for each annotated turn, the set of filled slots (shown between curly brackets), wherein a filled slot comprises an instance of a slot having a value, comprises the true partial dialog state. It will be appreciated that the temporal sequence information is fully represented in the annotations and can be extracted therefrom since it is known what turn a slot was filled and the position in the text that the slot values originate from. Various types of models can be trained from the annotations including a sequence classifier.

Referring again to FIG. 3, and as described above, the device/system 300 can be configured to enable a partial dialog state update that uses sequence classification at runtime, such as part of processing user input commands. The input manager 302 operates to convert user input into a textual representation. For example, the input manager 302 can use automatic speech recognition techniques to process spoken input to be input into the NLU component 304 for further processing. In one embodiment, the input manager 302 uses text normalization operations (e.g., lower casing, spelling error corrections, etc.) if the user input is text.

The NLU component 304 is configured to detect and/or fill slots for each turn. As described above, the slot detection and/or filling features of the NLU component 304 can be included as part of the PDS manager 306 when a single model is responsible for slot detection and partial dialog state update. As shown, a transformation that uses a result from the NLU component 304 for the current turn ($nlr_n$) (e.g., filled slots for the current turn) and the previous turn partial dialog state ($\hat{s}_{n-1}$) is symbolically illustrated by the operator ($\overline{U}$) representing a partial dialog state update function or algorithm. The transformation or partial dialog state update algorithm uses the sequence classification technique for example to drop a slot filled in some past turn that is no longer relevant in the current turn.

The sequence classification technique of an embodiment comprises a runtime operation that takes a sequence of words and associates a class with each word. As an example, for the spoken word sequence "show me batman returns", a sequence classification algorithm can be configured to output a sequence: <no_slot: show> <no_slot: me> <movie_name: batman> <movie_name: returns> that comprises a runtime sequence classification. According to one embodiment, the class "no_slot" is attributed by the sequence classification technique to words that are not associated with a slot.

The updated partial dialog state ($\hat{s}_n$) may be used as an input for the DS manager 308 to manage queries to one or more information sources (e.g., the knowledge backends).

The DS manager 308 of an embodiment operates to construct and/or issue queries using updated partial dialog states. For example, the DS manager 308 may construct queries at each turn, after some defined number of turns, and/or a current turn. The DS manager 308 is configured to manage and determine the full dialog state which may or may not include query results. The DS manager 308 of an embodiment operates to generate a number of dialog state hypotheses, such as a finite list of dialog state hypotheses. The DS manager 308 of one embodiment operates to generate one or more dialog state hypothesis with a score and/or probability for each hypothesis. One or more of the dialog state hypothesis comprising a dialog state distribution can be input to the policy execution component 312 for further action.

FIG. 3 illustrates a simplified case where the input to the policy execution component 312 is not a distribution over dialog state space (e.g., an n-best list of scored hypotheses) but a single state (assuming that a best or most relevant dialog state hypothesis was selected by the DS manager 308). As described above, and in accordance with an embodiment, at each new conversation turn, the partial dialog state can be reanalyzed from a certain turn in the past up to the current turn. In one embodiment, the partial dialog state can be reanalyzed based on all user inputs from the beginning of a session. It will be appreciated that a session may be defined according to each particular implementation.

Below describes a first partial dialog state distribution example generated using a sequence classification technique to manage the partial dialog state updating for 2 turns. For this example, the sequence classification is used to jointly model slot detection and partial dialog state tracking.

At the first turn:
Current turn user input text: "show me horror movies"
Sequence classification input: "show me horror movies"
Sequence classification output (partial dialog state distribution):
hypothesis0: <no_slot: show> <no_slot: me> <movie_genre: horror> <no_slot: me> <media_type: movies> {score=0.97}
hypothesis1: <no_slot: show> <no_slot: me> <movie_name: horror> <no_slot: me> <movie_name: returns> {score=0.02}
The second hypothesis illustrates a less likely partial dialog state with respect to the first hypothesis.

At the second turn:
Current turn user input text: "how about comedies instead"
Sequence classification input: "show me horror movies how about comedies instead"
Sequence classification output (partial dialog state distribution):
hypothesis0: <no_slot: show> <no_slot: me> <no_slot: horror> <no_slot: me> <media_type: movies> <no_slot: how> <no_slot: about> <movie_genre: comedies> <no_slot: instead> {score=0.98}
hypothesis1: <no_slot: show> <no_slot: me> <movie_genre: horror> <no_slot: me> <media_type: movies> <no_slot: how> <no_slot: about> <movie_genre: comedies> <no_slot: instead> {score=0.01}

The second partial dialog state hypothesis is less likely and incorrect since the less recent movie_genre slot value ("horror") has been kept. Thus, a distribution can be determined for the partial dialog state at each turn. In the above example, the partial dialog state distribution at each turn can be inferred from the list of hypotheses, each hypothesis having a score or probability. The number of hypotheses generated is configurable.

Modeling can also be used with logical operators as part of keeping or dropping slots and/or maintaining logical relationships between kept slots. According to an embodiment, logical relationships between/for slots can involve multiple and single slots (e.g. GreaterThan/SmallerThan).

As an example:
Turn 1: show me brad pitt movies
Turn 2: the ones with angelina jolie=>[Brad Pitt] AND [Angelina Jolie]
Alternatively, Turn 2: or Angelina jolie movies=>[Brad Pitt] OR [Angelina Jolie]

As an example, a sequence based model can be used to keep and/or drop slots along with the logical operators jointly or as separate models.

Table 2 below lists of relational/comparison and logical operators, with examples and annotations:

TABLE 2

|  | Example | Annotation |
| --- | --- | --- |
| Relational/Comparison operators | | |
| Greater than | Movies released after 2000 | release_date GREATERTHAN {2000} |
| Greater than or equal to | Movies rated four or more stars | star_rating GREATERTHAN orEqualTo {four} |
| Less than | Movies released before 1950 | release_date LESSTHAN {1950} |
| Less than or equal to | Movies rated not more than four stars | star_rating LESSTHAN orEqualTo {four} |
| Not equals | Shows not about cooking | synopsis_description NOTEQUALS{cooking} |
| LIKE/Similar to | I want something like The Hunger Games. | movie_title Like{The Hunger Games} |
| Logical Operators | | |
| AND | Show me Ben Stiller comedies. | {movie_actor = Ben Stiller} AND {movie_genre = comedies} |
| OR | Show me comedies and action movies | {movie_genre = action} OR {movie_genre = comedies} |
| | with Arnold Schwarzenegger or Sylvester Stallone | {movie_actor = Sylvester Stallone } OR {movie_actor = Arnold Schwarzenegger} |

Figure 4:
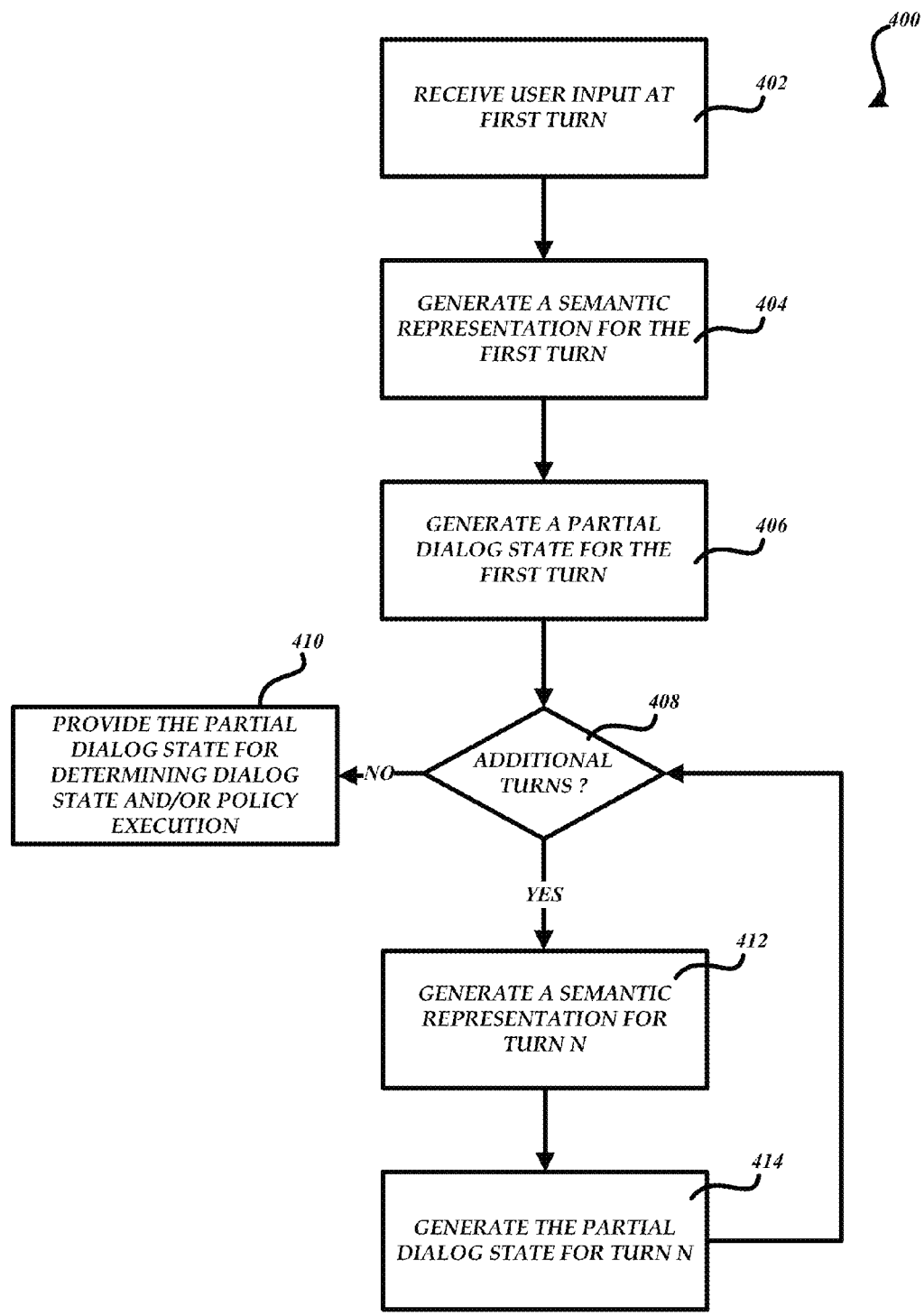
FIG. 4 is a flow diagram depicting an exemplary process of updating a partial dialog state as part of a managing and/or using a dialog state.

FIG. 4 is a flow diagram depicting an exemplary process 400 of updating a partial dialog state as part of a managing and/or using a dialog state according to an embodiment. The process 400 assumes training has been used to determine model parameters used for slot detection and partial dialog state updating across turns. The process 400 at 402 begins by receiving user input at a first turn. For example, a user may use a device microphone to issue a command involving one or more spoken words concerning the user's end goal. The process 400 at 402 may receive various user inputs, such as voice or typed inputs at smartphone, game console, tablet, etc.

At 404, the process 400 operates to generate a semantic representation using the input received at the first turn. For example, a natural language understanding module can be used to provide a semantic representation of the user input at the first turn. At 406, the process 400 operates to generate a partial dialog state for the first turn using the semantic representation. As described above, the partial dialog state is representative of the user goal and may be defined by one or more hypothesis resulting from application of a sequence classification technique at runtime. In an alternative embodiment, block 404 can be integrated with block 406 to track the partial dialog state at runtime by jointly modeling slot detection and partial dialog state tracking at each turn using sequence classification to generate a hypothesis distribution, wherein each hypothesis can be assigned a score, probability, and/or other measure.

If there are no additional turns at 408, the process 400 provides the partial dialog state at 410 which can be used to determine a dialog state and/or execute a policy or action. According to an embodiment, the process 400 at 408 operates to use the latest partial dialog state to form queries and use knowledge results based on the queries to quantify a full dialog state. It will be appreciated that other information may be used to determine the full dialog state. If there is an additional turn at 408, the process 400 generates a semantic representation of the user input for the additional turn at 412. At 414, the process 400 operates to generate the partial dialog state for the additional turn before returning to 408. While a certain number and order of operations is described for the exemplary flow of FIG. 4, it will be appreciated that other numbers and/or orders can be used according to desired implementations.

While sequence-based classification has been described, the embodiments are not so limited. For example, a sequence-based classification model may implicitly refer to Conditional Random Fields (CRF) or similar techniques as a machine learning technique for sequence learning/modeling. Partial dialog state update can be modeled by other classification and/or machine learning techniques, such as Maximum Entropy Models, Neural Nets, SVMs, Boosted Decision Trees, Random as a few examples.

It will be appreciated that various features described herein can be implemented as part of a processor-driven environment including hardware and software components. Also, while certain embodiments and examples are described above for illustrative purposes, other embodiments are included and available, and the described embodiments should not be used to limit the claims. Suitable programming means include any means for directing a computer system or device to execute steps of a process or method, including for example, systems comprised of processing units and arithmetic-logic circuits coupled to computer memory, which systems have the capability of storing in computer memory, which computer memory includes electronic circuits configured to store data and program instructions or code.

An exemplary computer program product is useable with any suitable data processing system. While a certain number and types of components are described above, it will be appreciated that other numbers and/or types and/or configurations can be included according to various embodiments. Accordingly, component functionality can be further divided and/or combined with other component functionalities according to desired implementations. The term computer readable media as used herein can include computer storage media or computer storage. The computer storage of an embodiment stores program code or instructions that operate to perform some function. Computer storage media can include volatile and nonvolatile, removable and non-removable media implemented in any method or technology for storage of information, such as computer readable instructions, data structures, program modules, etc.

System memory, removable storage, and non-removable storage are all computer storage media examples (i.e., memory storage). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by a computing device. Any such computer storage media may be part of a device or system. By way of example, and not limitation, communication media may include wired media such as a wired network or direct-wired connection, and wireless media such as acoustic, RF, infrared, and other wireless media.

The embodiments and examples described herein are not intended to be limiting and other embodiments are available. Moreover, the components described above can be implemented as part of networked, distributed, and/or other computer-implemented environment. The components can communicate via a wired, wireless, and/or a combination of communication networks. Network components and/or couplings between components of can include any of a type, number, and/or combination of networks and the corresponding network components which include, but are not limited to, wide area networks (WANs), local area networks (LANs), metropolitan area networks (MANs), proprietary networks, backend networks, cellular networks, etc.

Client computing devices/systems and servers can be any type and/or combination of processor-based devices or systems. Additionally, server functionality can include many components and include other servers. Components of the computing environments described in the singular tense may include multiple instances of such components. While certain embodiments include software implementations, they are not so limited and encompass hardware, or mixed hardware/software solutions.

Terms used in the description, such as component, module, system, device, cloud, network, and other terminology, generally describe a computer-related operational environment that includes hardware, software, firmware and/or other items. A component can use processes using a processor, executable, and/or other code. Exemplary components include an application, a server running on the application, and/or an electronic communication client coupled to a server for receiving communication items. Computer resources can include processor and memory resources such as: digital signal processors, microprocessors, multi-core processors, etc. and memory components such as magnetic, optical, and/or other storage devices, smart memory, flash memory, etc. Communication components can be used to communicate computer-readable information as part of transmitting, receiving, and/or rendering electronic communication items using a communication network or networks, such as the Internet for example. Other embodiments and configurations are included.

Figure 5:
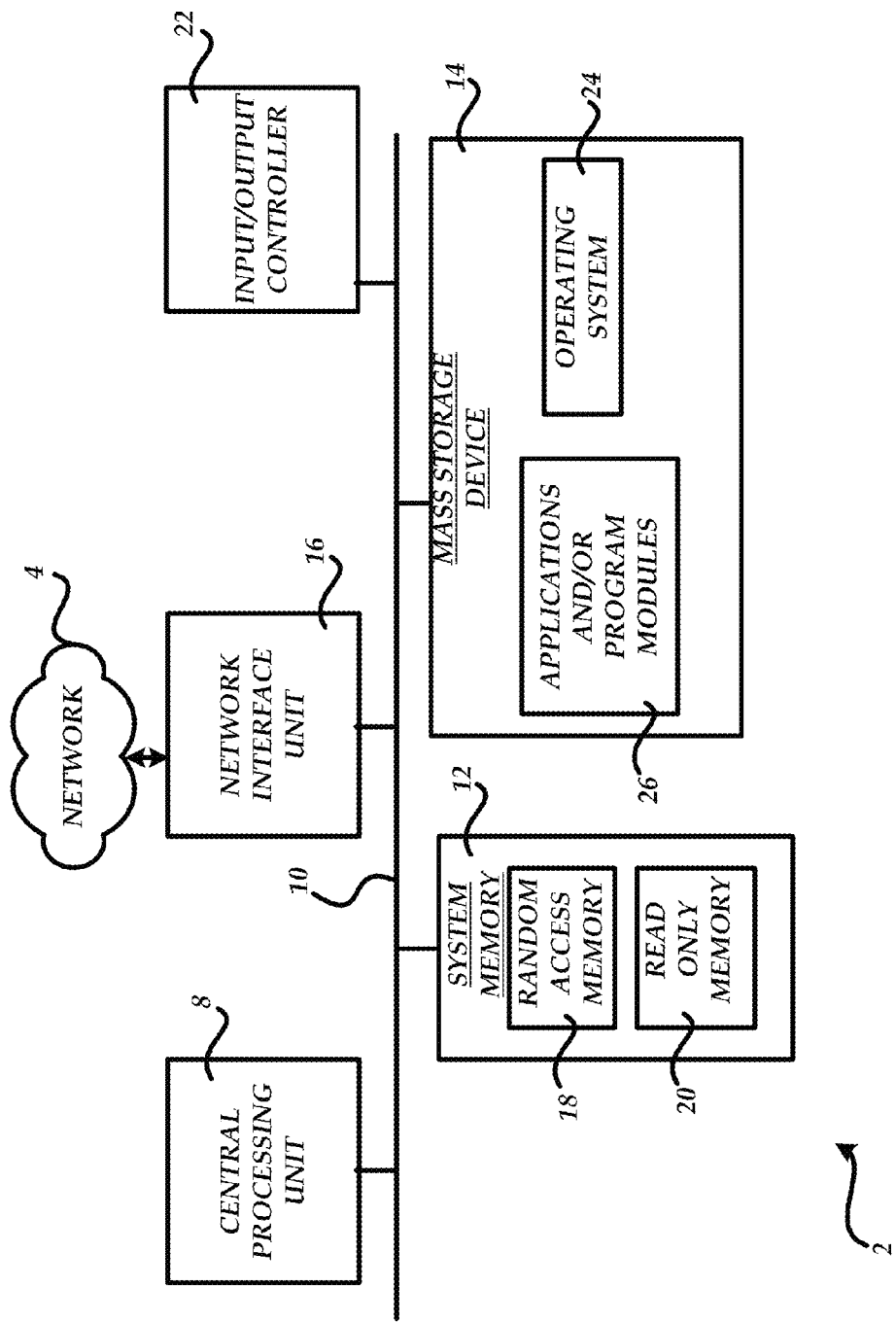
FIG. 5 is a block diagram illustrating an exemplary computing environment for implementation of various embodiments.

Referring now to FIG. 5, the following provides a brief, general description of a suitable computing environment in which embodiments be implemented. While described in the general context of program modules that execute in conjunction with program modules that run on an operating system on various types of computing devices/systems, those skilled in the art will recognize that the invention may also be implemented in combination with other types of computer devices/systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

As shown in FIG. 5, computer 2 comprises a general purpose server, desktop, laptop, handheld, or other type of computer capable of executing one or more application programs including an email application or other application that includes email functionality. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20. The computer 2 further includes a mass storage device 14 for storing an operating system 24, application programs, and other program modules/resources 26.

The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2.

According to various embodiments, the computer 2 may operate in a networked environment using logical connections to remote computers through a network 4, such as a local network, the Internet, etc. for example. The computer 2 may connect to the network 4 through a network interface unit 16 connected to the bus 10. It should be appreciated that the network interface unit 16 may also be utilized to connect to other types of networks and remote computing systems. The computer 2 may also include an input/output controller 22 for receiving and processing input from a number of other devices, including a keyboard, mouse, etc. (not shown). Similarly, an input/output controller 22 may provide output to a display screen, a printer, or other type of output device.

As mentioned briefly above, a number of program modules and data files may be stored in the mass storage device 14 and RAM 18 of the computer 2, including an operating system 24 suitable for controlling the operation of a networked personal computer, such as the WINDOWS operating systems from MICROSOFT CORPORATION of Redmond, Wash. The mass storage device 14 and RAM 18 may also store one or more program modules. In particular, the mass storage device 14 and the RAM 18 may store application programs, such as word processing, spreadsheet, drawing, e-mail, and other applications and/or program modules, etc.

Figure 6A:
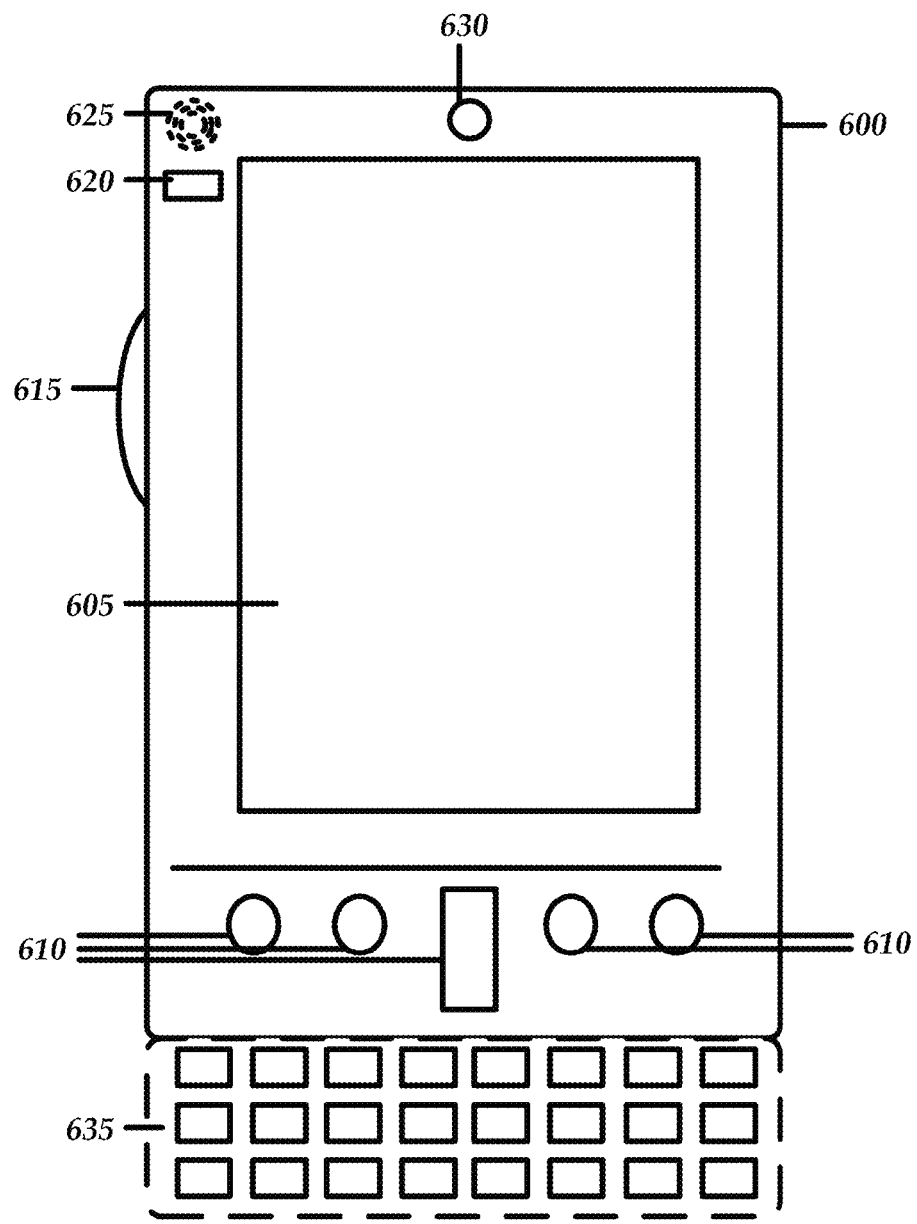
FIGS. 6A-6B illustrate a mobile computing device with which embodiments may be practiced.
Figure 6B:
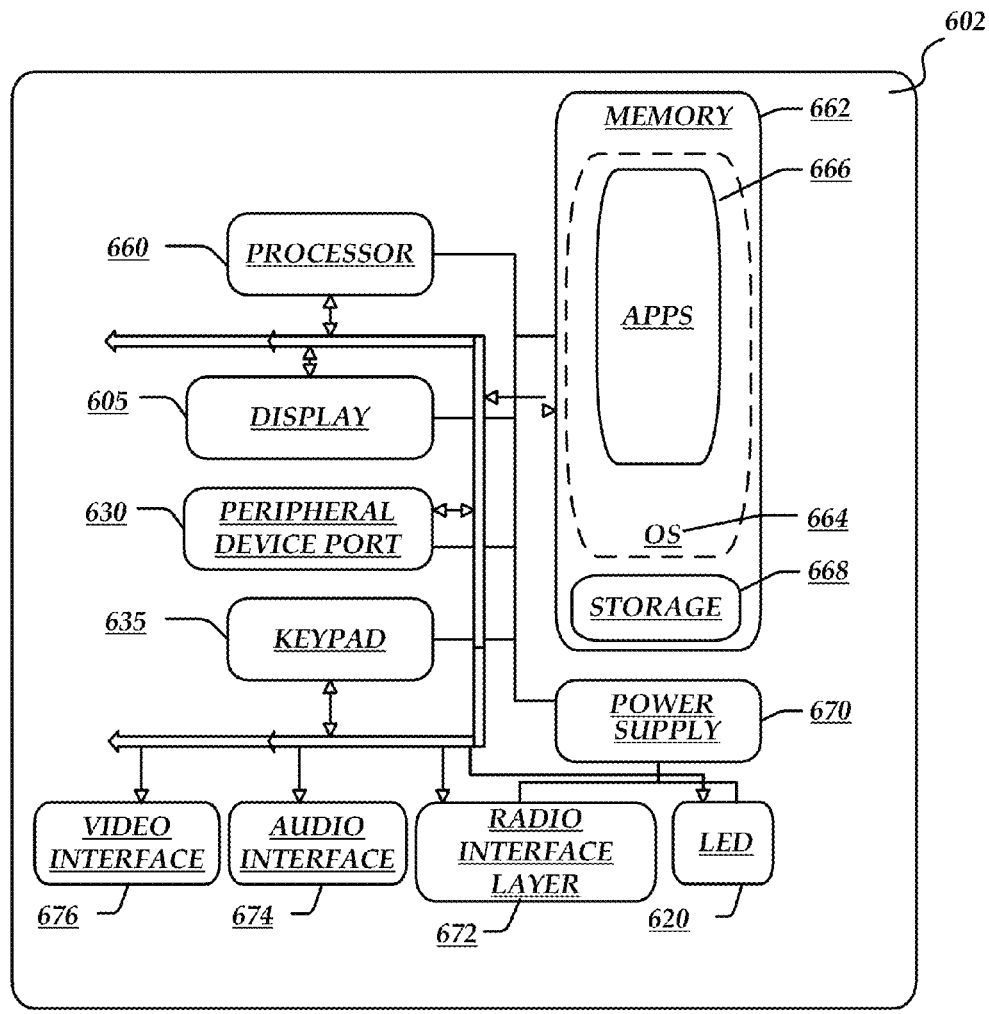

FIGS. 6A-6B illustrate a mobile computing device 600, for example, a mobile telephone, a smart phone, a tablet personal computer, a laptop computer, and the like, with which embodiments may be practiced. With reference to FIG. 6A, one embodiment of a mobile computing device 600 for implementing the embodiments is illustrated. In a basic configuration, the mobile computing device 600 is a handheld computer having both input elements and output elements.

The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative embodiments, mobile computing device 600 may incorporate more or less input elements. For example, the display 605 may not be a touch screen in some embodiments. In yet another alternative embodiment, the mobile computing device 600 is a portable phone system, such as a cellular phone.

The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some embodiments, the mobile computing device 600 incorporates a vibration transducer for providing the user with tactile feedback. In yet another embodiment, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one embodiment of a mobile computing device. That is, the mobile computing device 600 can incorporate a system (i.e., an architecture) 602 to implement some embodiments. In one embodiment, the system 602 is implemented as a "smart phone" capable of running one or more applications (e.g., browser, e-mail, calendaring, contact managers, messaging clients, games, and media clients/players). In some embodiments, the system 602 is integrated as a computing device, such as an integrated personal digital assistant (PDA) and wireless phone.

One or more application programs 666, including a notes application, may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down.

The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

The system 602 has a power supply 670, which may be implemented as one or more batteries. The power supply 670 might further include an external power source, such as an AC adapter or a powered docking cradle that supplements or recharges the batteries. The system 602 may also include a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 666 via the operating system 664, and vice versa.

The visual indicator 620 may be used to provide visual notifications and/or an audio interface 674 may be used for producing audible notifications via the audio transducer 625. In the illustrated embodiment, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device.

The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with embodiments, the microphone may also serve as an audio sensor to facilitate control of notifications, as will be described below. The system 602 may further include a video interface 676 that enables an operation of an on-board camera 630 to record still images, video stream, and the like. A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio 672 or via a distributed computing network. Similarly, such data/information may be readily transferred between computing devices for storage and use according to well-known data/information transfer and storage means, including electronic mail and collaborative data/information sharing systems.

Figure 7:
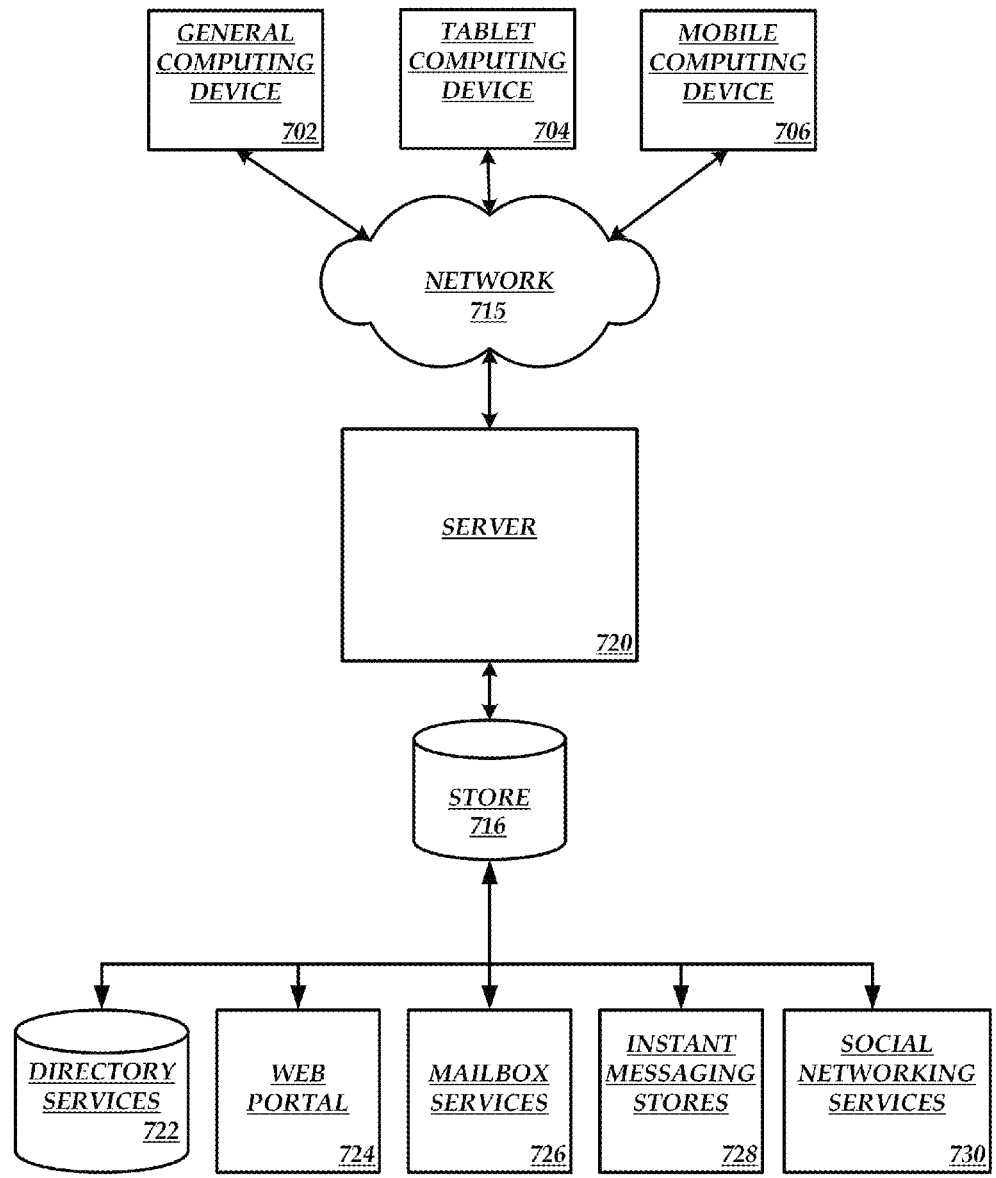
FIG. 7 illustrates one embodiment of a system architecture for implementation of various embodiments.

FIG. 7 illustrates one embodiment of a system architecture for implementing dialog management features. Content, including dialog state processing information, may be stored in different communication channels or storage types. For example, various information may be stored/accessed using a directory service 722, a web portal 724, a mailbox service 726, an instant messaging store 728, and/or a social networking site 730. A server 720 may provide additional dialog management and other features. As one example, the server 720 may provide rules that are used to distribute outbound email using a number of datacenter partitions over network 715, such as the Internet or other network(s) for example. By way of example, the client computing device may be implemented as a general computing device 702 and embodied in a personal computer, a tablet computing device 704, and/or a mobile computing device 706 (e.g., a smart phone). Any of these clients may use content from the store 716.

Embodiments, for example, are described above with reference to block diagrams and/or operational illustrations of methods, systems, computer program products, etc. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

It should be appreciated that various embodiments can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A system for updating a partial dialog state, the system configured to:
   receive user input at a first turn;
   generate a semantic representation based on the user input at the first turn;
   generate a partial dialog state based in part on the semantic representation associated with the first turn;
   receive user input at a second turn;
   generate the semantic representation based on the user input at the second turn;
   update the partial dialog state for the second turn using a discriminative model using the semantic representation associated with the first turn and the second turn, wherein the partial dialog state is based on a time ordered sequence of an estimated user goal; and based in part on the partial dialog state, determining a dialog state as part of tracking a user goal.

2. The system of claim 1, further configured to use a sequence-based classification model at runtime to jointly model slot detection and partial dialog state tracking by detecting slots and updating the partial dialog state.

3. The system of claim 1, further configured to use separate models to detect slots and update the partial dialog state at runtime.

4. The system of claim 1, further configured to:
generate a dialog state using the partial dialog state and knowledge results obtained from one or more knowledge sources; and
execute a policy based on the dialog state.

5. The system of claim 1, further configured to update the partial dialog state before querying any knowledge sources.

6. The system of claim 1, further configured to manage the update of the partial dialog state by integrating the semantic representation of the user input across multiple turns including one or more of the first turn, one or more intermediate turns, and a current turn.

7. The system of claim 6, further configured to generate the partial dialog state to include filled slots that remain relevant for the current turn.

8. The system of claim 1, further configured to perform partial dialog state tracking in part by managing slots to be kept or dropped across turns.

9. The system of claim 1, further configured to generate a distribution over partial dialog states using sequence classification decoding operations to generate one or more hypothesis including a confidence score or probability for each hypothesis.

10. The system of claim 9, wherein the one or more hypothesis provides an estimate of a distribution over a partial dialog state space.

11. A method comprising:
determining a partial dialog state for a turn based in part on user input associated with the turn;
using a discriminative model to update the partial dialog state for a current turn based in part on the partial dialog state associated with the turn, wherein the partial dialog state is a time ordered sequence of an estimated user goal; and
determining a dialog state based in part on the partial dialog state at the current turn as part of tracking a user goal.

12. The method of claim 11, further comprising using a single sequence based classification model at runtime for slot detection and partial dialog state updating.

13. The method of claim 11, further comprising using sequence classification decoding operations to generate a partial dialog state distribution over partial dialog states comprising a finite list of possible states.

14. The method of claim 11, further comprising using the partial dialog state of the current turn to query one or more knowledge sources and determine the dialog state.

15. The method of claim 11, further comprising updating the partial dialog state by determining which filled slots remain relevant in the current turn.

16. The method of claim 11, further comprising updating the partial dialog state using information associated with when each slot was filled and a textual position that slot values originate from.

17. A computer-readable storage device which stores executable instructions that operate to:
determine a semantic representation based on user input at a first turn using natural language processing operations;
determine a partial dialog state for the first turn based in part on the semantic representation associated with the first turn;
determine the semantic representation based on the user input at a second turn; and
update the partial dialog state for the second turn based in part on the semantic representation associated with the first turn and the second turn, wherein the partial dialog state is a time ordered sequence of an estimated user goal; and
based in part on the partial dialog state, determining a dialog state as part of tracking a user goal.

18. The computer-readable storage device of claim 17, wherein the instructions operate further to jointly model slot detection and partial dialog state tracking in part by using a runtime sequence classification technique.

19. The computer-readable storage device of claim 17, wherein the instructions operate further to update the partial dialog state by one of dropping, adding, or modifying a slot.

20. The computer-readable storage device of claim 17, wherein the instructions operate further to use a class to identify words that are not associated with a slot.

* * * * *